United States Patent
Gao et al.

(10) Patent No.: US 11,860,980 B2
(45) Date of Patent: Jan. 2, 2024

(54) COGNITIVE METHOD TO SPLIT MONOLITHIC ARCHITECTURE INTO MICROSERVICE ARCHITECTURE

(71) Applicant: INTERNATIONAL BUSINESS MACHINES CORPORATION, Armonk, NY (US)

(72) Inventors: Li Juan Gao, Xi'an (CN); Zhong Fang Yuan, Xi'an (CN); Chen Gao, Xi'an (CN); Tong Liu, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 17/647,075

(22) Filed: Jan. 5, 2022

(65) Prior Publication Data
US 2023/0229741 A1 Jul. 20, 2023

(51) Int. Cl.
G06F 8/41 (2018.01)
G06F 18/20 (2023.01)

(52) U.S. Cl.
CPC .............. *G06F 18/29* (2023.01); *G06F 8/433* (2013.01); *G06F 8/436* (2013.01)

(58) Field of Classification Search
CPC ...................................................... G06F 8/433
USPC ......................................................... 717/133
See application file for complete search history.

(56) References Cited

U.S. PATENT DOCUMENTS

| | | | |
|---|---|---|---|
| 8,181,153 B2 | 5/2012 | Grechanik | |
| 10,430,250 B2 | 10/2019 | Ueda | |
| 10,496,935 B2 * | 12/2019 | Sachdev | H04L 41/145 |
| 10,545,738 B1 * | 1/2020 | Jaeger | G06F 8/427 |
| 10,579,370 B2 * | 3/2020 | Gupta | G06F 8/20 |
| 10,628,152 B2 * | 4/2020 | Chandramouli | G06F 8/65 |
| 10,936,291 B1 | 3/2021 | Gamliel | |
| 10,970,067 B1 * | 4/2021 | Gupta | G06F 8/20 |
| 11,157,249 B1 * | 10/2021 | Rapson | G06F 8/433 |
| 11,194,558 B2 * | 12/2021 | Rihani | G06F 8/64 |
| 11,366,641 B2 * | 6/2022 | Vadayadiyil Raveendran | G06T 7/60 |
| 11,397,576 B2 * | 7/2022 | Vs | G06F 8/76 |
| 11,500,628 B1 * | 11/2022 | Chawda | G06F 8/77 |
| 11,586,482 B2 * | 2/2023 | Che | G06F 9/4881 |

(Continued)

FOREIGN PATENT DOCUMENTS

| | | | | |
|---|---|---|---|---|
| CN | 110909015 B | * | 7/2022 | ......... G06F 16/2433 |
| CN | 114723976 A | * | 7/2022 | |

(Continued)

OTHER PUBLICATIONS

Gianluca Filippone, et al. "From monolithic to microservice architecture: an automated approach based on graph clustering and combinatorial optimization"; 2023 IEEE 20th International Conference on Software Architecture (ICSA).*

(Continued)

*Primary Examiner* — Francisco J Aponte
(74) *Attorney, Agent, or Firm* — Mark Bergner

(57) ABSTRACT

A method and related system detail a split of an architecture of a monolithic application into an architecture of a micro service application. The method receives source code for the monolithic application, and maps the source code into a directed graph. The graph is split into subgraphs and optimized. The method further provides the detailing of the micro service application split, based on the subgraphs.

11 Claims, 9 Drawing Sheets

(56) References Cited

U.S. PATENT DOCUMENTS

| | | | | |
|---|---|---|---|---|
| 11,614,934 | B1* | 3/2023 | Chakrabarty | G06F 8/31 |
| | | | | 717/110 |
| 2019/0108067 | A1* | 4/2019 | Ishikawa | H04L 41/50 |
| 2019/0171438 | A1* | 6/2019 | Franchitti | G06N 20/00 |
| 2020/0401386 | A1* | 12/2020 | Punathil | G06F 8/433 |
| 2021/0011688 | A1* | 1/2021 | Sasidharan | G06F 8/10 |
| 2021/0232390 | A1* | 7/2021 | Hwang | H04L 41/16 |
| 2021/0334194 | A1* | 10/2021 | Xiao | G06F 11/3447 |
| 2022/0006706 | A1* | 1/2022 | Patodia | H04L 41/5019 |

FOREIGN PATENT DOCUMENTS

| | | | | |
|---|---|---|---|---|
| CN | 114647465 B | * | 8/2022 | |
| DE | 112021000467 T5 | * | 11/2022 | G06F 11/302 |
| WO | 2021064058 A1 | | 4/2021 | |

OTHER PUBLICATIONS

Miguel Brito et al. "Identification of Microservices from Monolithic Applications through Topic Modelling"; SAC '21, Mar. 22-26, 2021, Virtual Event, Republic of Korea.*

NPL—English Text Translation for CN114723976.*

G. Kecskemeti, A. C. Marosi and A. Kertesz, "The Entice approach to decompose monolithic services into microservices," 2016 International Conference on High Performance Computing & Simulation (HPCS), 2016, pp. 591-596, doi: 10.1109/HPCSim.2016.7568389.

Gregory, Steve, "Finding overlapping communities in networks by label propagation," New Journal of Physics, Oct. 13, 2010, IOP Publishing, SP103018, Issue 10, vol. 12, http://dx.doi.org/10.1088/1367-2630/12/10103018.

Jakob Lohnertz. (2020). Steinmetz: Toward automatic decomposition of monolithic software into microservices [Zenodo]. https://doi.org/10.5281/zenodo.4280725.

Sam Newman and Leandro Guimaraes, Migrating Monoliths to Microservices with Decomposition and Incremental Changes, INFOQ, Feb. 9, 2021, https://www.infoq.com/articles/migrating-monoliths-to-microservices-with-decomposition/.

System and Method for Cognitive Microservices Recommendations, ip.com, IPCOM000264284D, Published Nov. 30, 2020, https://priorart.ip.com/IPCOM/000264284.

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

COGNITIVE METHOD TO SPLIT MONOLITHIC ARCHITECTURE INTO MICROSERVICE ARCHITECTURE

BACKGROUND

Disclosed herein is a system and related method to split monolithic architecture into microservice architecture. A transition of software architectures from monolithic to microservice provides many benefits, but may be time consuming when done manually.

SUMMARY

According to one aspect disclosed herein, a computer-implemented method is provided for detailing a split of an architecture of a monolithic application into an architecture of a micro service application. The method comprises receiving source code for the monolithic application, and mapping the source code into a directed graph. The graph is split into subgraphs and optimized. The method further provides the detailing of the micro service application split, based on the subgraphs.

According to another aspect, a system is provided comprising a memory and a processor that executes instructions to perform the method is also described herein, along with a computer program product.

The computer program product contains instructions that are, accessible from a computer-usable or computer-readable medium providing program code for use, by, or in connection, with a computer or any instruction execution system. For the purpose of this description, a computer-usable or computer-readable medium may be any apparatus that may contain a mechanism for storing, communicating, propagating or transporting the program for use, by, or in connection, with the instruction execution system, apparatus, or device.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

The following general acronyms may be used below:

TABLE 1

| General Acronyms | |
| --- | --- |
| API | application program interface |
| ARM | advanced RISC machine |
| CD-ROM | compact disc ROM |
| CPU | central processing unit |
| DPS | data processing system |
| DVD | digital versatile disk |
| EPROM | erasable programmable read-only memory |
| FPGA | field-programmable gate arrays |
| HA | high availability |
| IaaS | infrastructure as a service |
| I/O | input/output |
| IPL | initial program load |
| ISP | Internet service provider |
| ISA | instruction-set-architecture |
| LAN | local-area network |
| LPAR | logical partition |
| PaaS | platform as a service |
| PDA | personal digital assistant |
| PLA | programmable logic arrays |
| RAM | random access memory |
| RISC | reduced instruction set computer |
| ROM | read-only memory |
| SaaS | software as a service |
| SLA | service level agreement |
| SRAM | static random-access memory |
| WAN | wide-area network |

Data Processing System In General

Figure 1A:
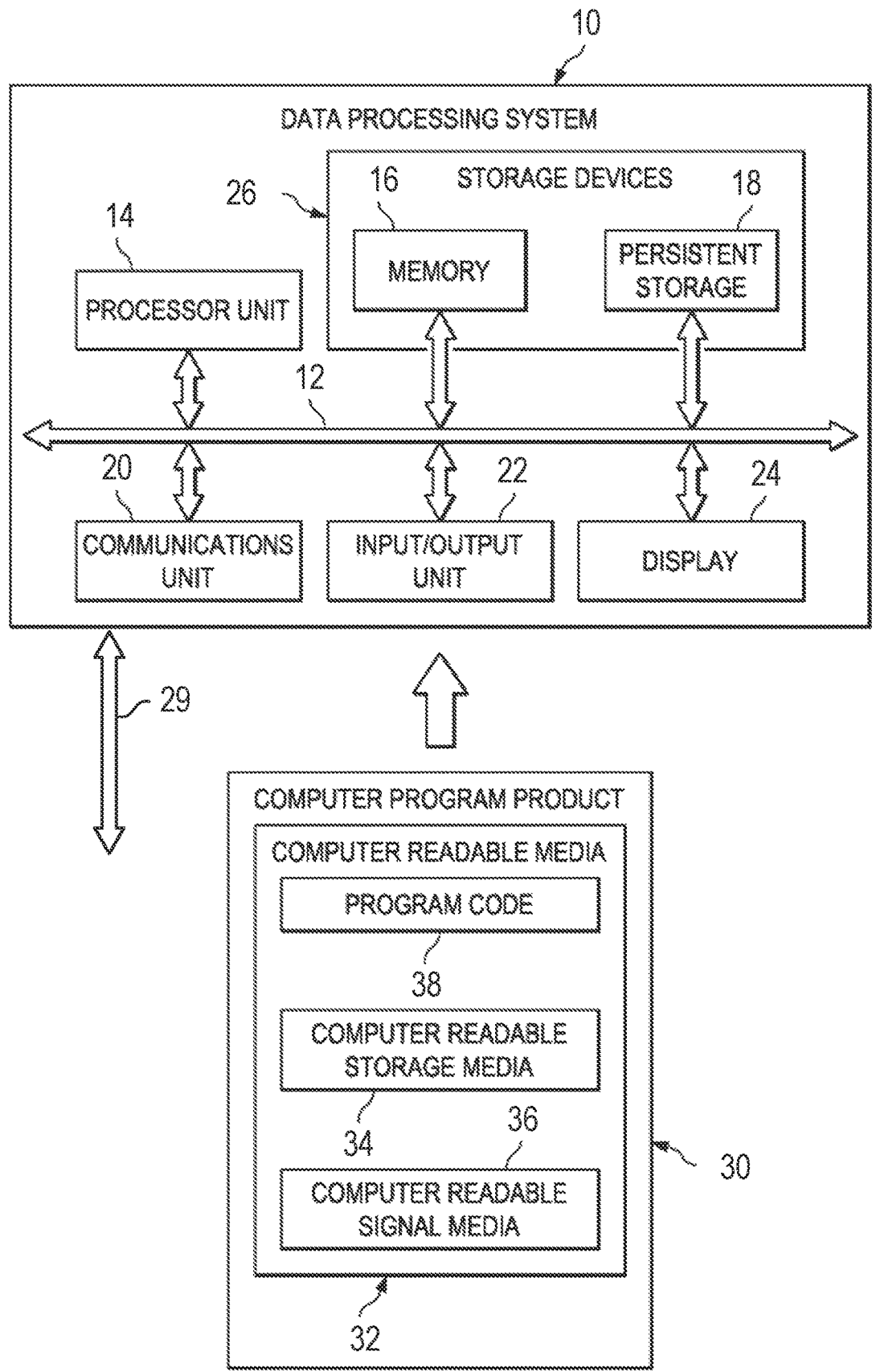
FIG. 1A is a block diagram of a data processing system (DPS) according to one or more embodiments disclosed herein.

FIG. 1A is a block diagram of an example DPS according to one or more embodiments. In this illustrative example, the DPS 10 may include communications bus 12, which may provide communications between a processor unit 14, a memory 16, persistent storage 18, a communications unit 20, an I/O unit 22, and a display 24.

The processor unit 14 serves to execute instructions for software that may be loaded into the memory 16. The processor unit 14 may be a number of processors, a multi-core processor, or some other type of processor, depending on the particular implementation. A number, as used herein with reference to an item, means one or more items. Further, the processor unit 14 may be implemented using a number of heterogeneous processor systems in which a main processor is present with secondary processors on a single chip. As another illustrative example, the processor unit 14 may be a symmetric multi-processor system containing multiple processors of the same type.

The memory 16 and persistent storage 18 are examples of storage devices 26. A storage device may be any piece of hardware that is capable of storing information, such as, for example without limitation, data, program code in functional form, and/or other suitable information either on a temporary basis and/or a permanent basis. The memory 16, in these examples, may be, for example, a random access memory or any other suitable volatile or non-volatile storage device. The persistent storage 18 may take various forms depending on the particular implementation.

For example, the persistent storage 18 may contain one or more components or devices. For example, the persistent storage 18 may be a hard drive, a flash memory, a rewritable optical disk, a rewritable magnetic tape, or some combination of the above. The media used by the persistent storage 18 also may be removable. For example, a removable hard drive may be used for the persistent storage 18.

The communications unit 20 in these examples may provide for communications with other DPSs or devices. In these examples, the communications unit 20 is a network interface card. The communications unit 20 may provide communications through the use of either or both physical and wireless communications links.

The input/output unit 22 may allow for input and output of data with other devices that may be connected to the DPS 10. For example, the input/output unit 22 may provide a connection for user input through a keyboard, a mouse, and/or some other suitable input device. Further, the input/output unit 22 may send output to a printer. The display 24 may provide a mechanism to display information to a user.

Instructions for the operating system, applications and/or programs may be located in the storage devices 26, which are in communication with the processor unit 14 through the communications bus 12. In these illustrative examples, the instructions are in a functional form on the persistent storage 18. These instructions may be loaded into the memory 16 for execution by the processor unit 14. The processes of the different embodiments may be performed by the processor unit 14 using computer implemented instructions, which may be located in a memory, such as the memory 16. These instructions are referred to as program code 38 (described below) computer usable program code, or computer readable program code that may be read and executed by a processor in the processor unit 14. The program code in the different embodiments may be embodied on different physical or tangible computer readable media, such as the memory 16 or the persistent storage 18.

The DPS 10 may further comprise an interface for a network 29. The interface may include hardware, drivers, software, and the like to allow communications over wired and wireless networks 29 and may implement any number of communication protocols, including those, for example, at various levels of the Open Systems Interconnection (OSI) seven layer model.

FIG. 1A further illustrates a computer program product 30 that may contain the program code 38. The program code 38 may be located in a functional form on the computer readable media 32 that is selectively removable and may be loaded onto or transferred to the DPS 10 for execution by the processor unit 14. The program code 38 and computer readable media 32 may form a computer program product 30 in these examples. In one example, the computer readable media 32 may be computer readable storage media 34 or computer readable signal media 36. Computer readable storage media 34 may include, for example, an optical or magnetic disk that is inserted or placed into a drive or other device that is part of the persistent storage 18 for transfer onto a storage device, such as a hard drive, that is part of the persistent storage 18. The computer readable storage media 34 also may take the form of a persistent storage, such as a hard drive, a thumb drive, or a flash memory, that is connected to the DPS 10. In some instances, the computer readable storage media 34 may not be removable from the DPS 10.

Alternatively, the program code 38 may be transferred to the DPS 10 using the computer readable signal media 36. The computer readable signal media 36 may be, for example, a propagated data signal containing the program code 38. For example, the computer readable signal media 36 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 38 may be downloaded over a network to the persistent storage 18 from another device or DPS through the computer readable signal media 36 for use within the DPS 10. For instance, program code stored in a computer readable storage medium in a server DPS may be downloaded over a network from the server to the DPS 10. The DPS providing the program code 38 may be a server computer, a client computer, or some other device capable of storing and transmitting the program code 38.

The different components illustrated for the DPS 10 are not meant to provide architectural limitations to the manner in which different embodiments may be implemented. The different illustrative embodiments may be implemented in a DPS including components in addition to or in place of those illustrated for the DPS 10.

Cloud Computing In General

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics Are As Follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models Are As Follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models Are As Follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1B:
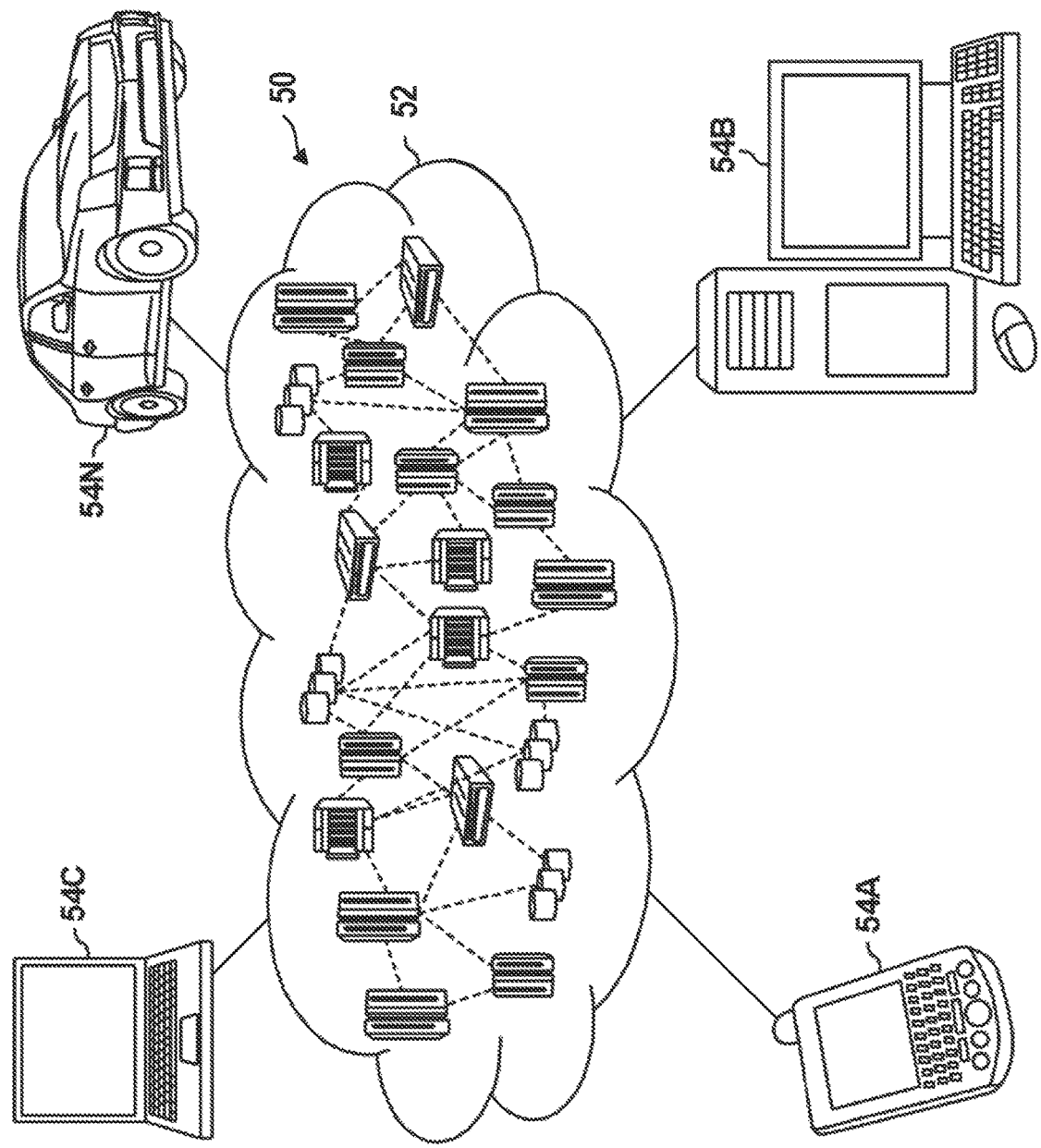
FIG. 1B is a pictorial diagram that depicts a cloud computing environment according to an embodiment disclosed herein.

Referring now to FIG. 1B, illustrative cloud computing environment 52 is depicted. As shown, cloud computing environment 52 includes one or more cloud computing nodes 50 with which local computing devices used by cloud consumers, such as, for example, personal digital assistant (PDA) or cellular telephone 54A, desktop computer 54B, laptop computer 54C, and/or automobile computer system 54N may communicate. Nodes 50 may communicate with one another. They may be grouped (not shown) physically or virtually, in one or more networks, such as Private, Community, Public, or Hybrid clouds as described hereinabove, or a combination thereof. This allows cloud computing environment 52 to offer infrastructure, platforms and/or software as services for which a cloud consumer does not need to maintain resources on a local computing device. It is understood that the types of computing devices 54A-N shown in FIG. 1B are intended to be illustrative only and that computing nodes 50 and cloud computing environment 52 can communicate with any type of computerized device over any type of network and/or network addressable connection (e.g., using a web browser).

Figure 1C:
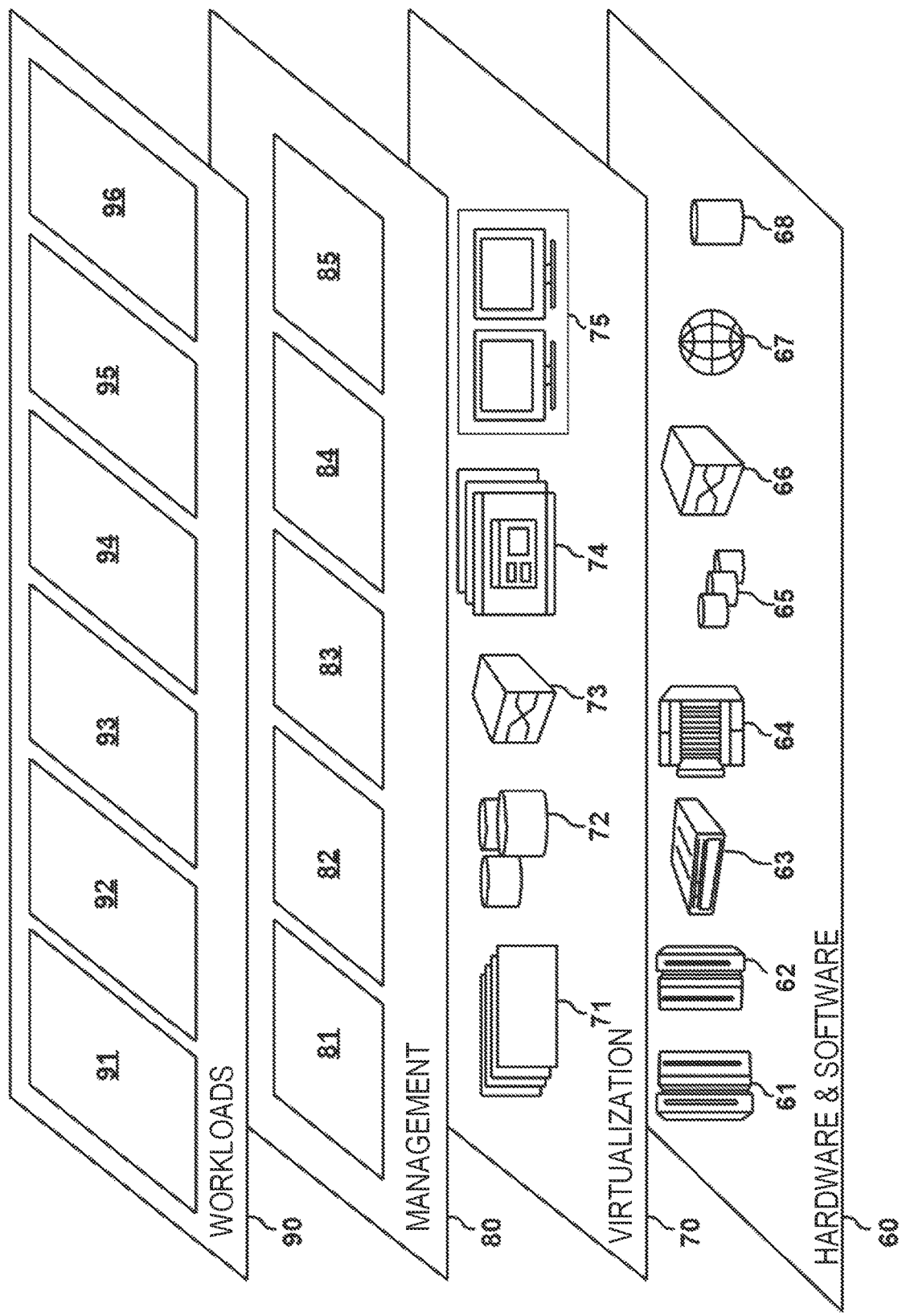
FIG. 1C is a pictorial diagram that depicts abstraction model layers according to an embodiment disclosed herein.

Referring now to FIG. 1C, a set of functional abstraction layers provided by cloud computing environment 52 (FIG. 1B) is shown. It should be understood in advance that the components, layers, and functions shown in FIG. 1C are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Any of the nodes 50 in the computing environment 52 as well as the computing devices 54A-N may be a DPS 10.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

Computer Readable Media

The present invention may be a system, a method, and/or a computer readable media at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2A:
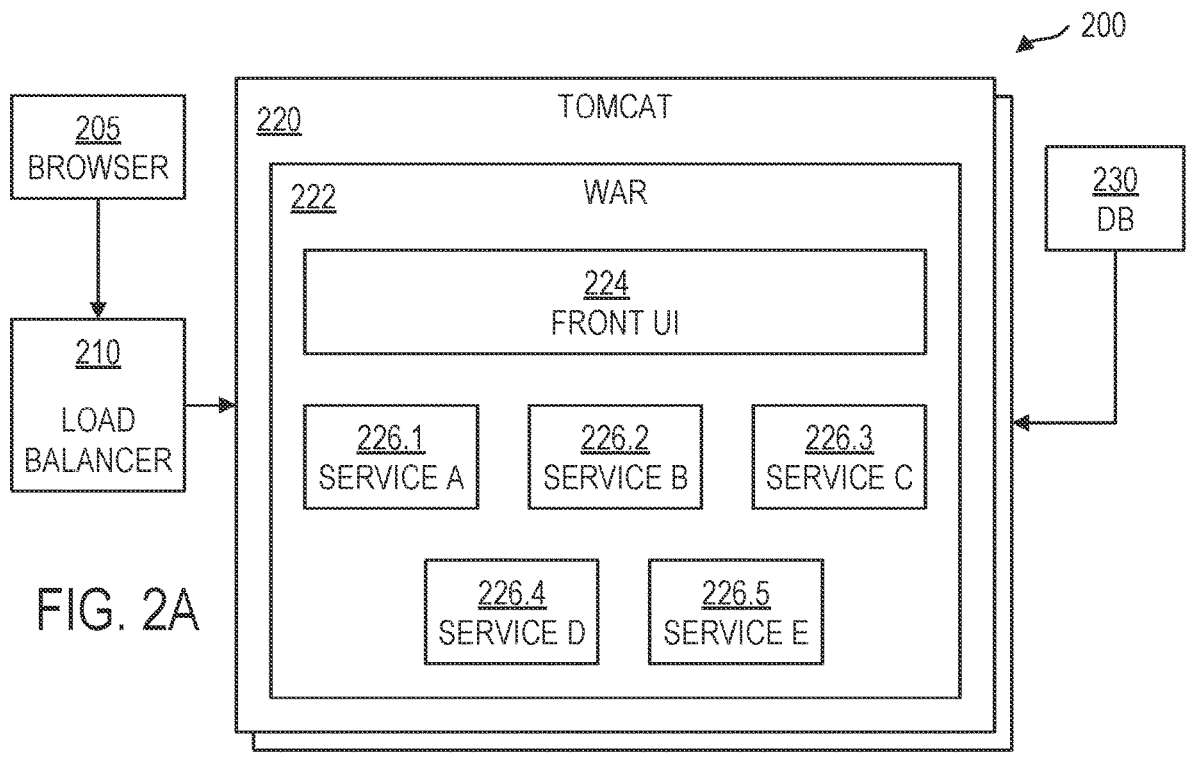
FIG. 2A is a block diagram that illustrates an example of an environment for executing a monolithic application, according to some embodiments.

Cognitive Method To Split Monolithic Architecture Into Microservice Architecture Traditionally, software has been implemented in a monolithic application structure. FIG. 2A is a block diagram that illustrates an example of an environment 200 for executing a monolithic application 222. In this example, an application consumer may use a browser 205 to access a cloud 220, such as the cloud computing environment 52, a node 50 in the cloud, or individual computer "Tomcat" 220, such as the DPS 10. The environment 200 may have a load balancer 210 between the user's browser 205. The browser 205 may be used to access various services, Service A through Service E 226.1-226.5 (referred to collectively or representatively as 226). The services may execute within the monolithic application "War" 222, and a front-end user interface 224 may be used to present information to the user. The services 226 may make use of data stored in a database 230.

Figure 2B:
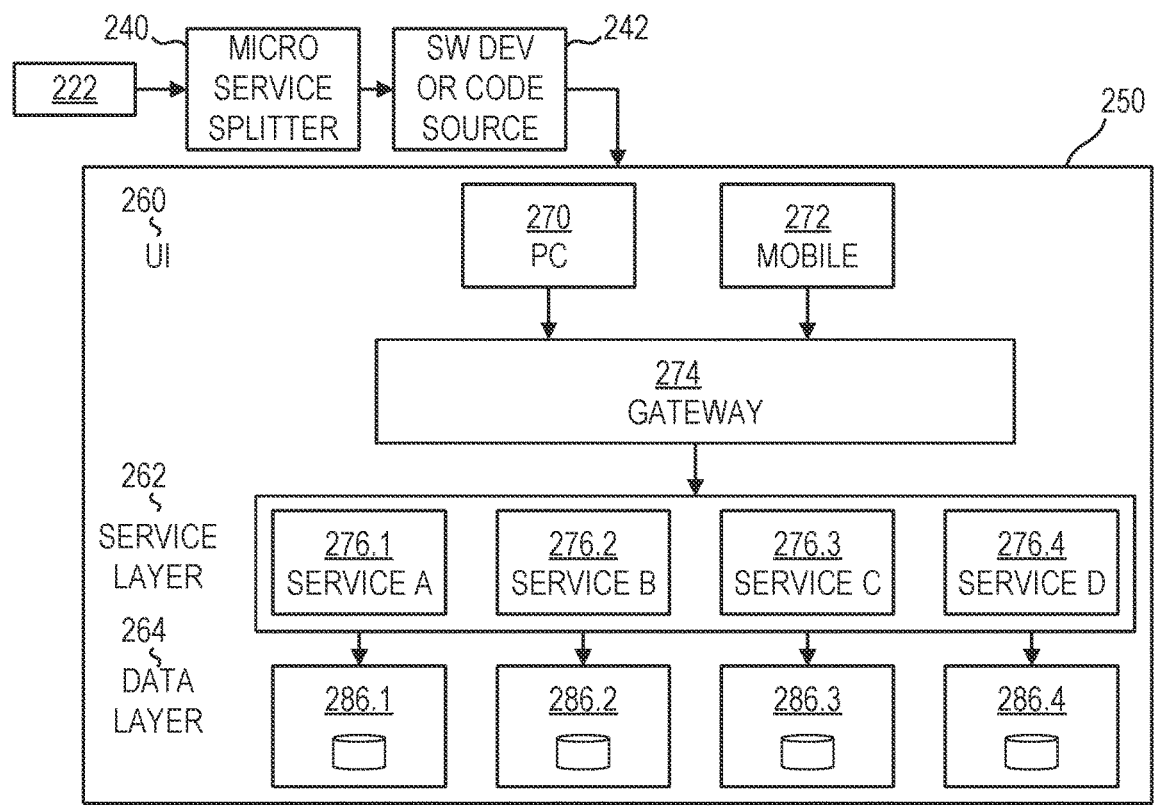
FIG. 2B is a block diagram illustrating a transition from a monolithic application to a micro service application, according to some embodiments.

Referring to FIG. 2B, which is a block diagram illustrating a transition from a monolithic application to a micro service application, code for the monolithic application 222 may be provided to a microservice splitter 240, as described herein, and the output of the microservice splitter 240 may be to provide splitting recommendations to a developer, or to provide an actual modification of the code itself 242 such that the developer's modified code or the modified code may be used to generate an application in the form of a microservice architecture 250. Compared with the traditional monolithic application 200 architecture, the microservice architecture 250 has the characteristics of low coupling between different modules, simple code maintenance, load balancing, and strong scalability. It is suitable for agile development and deployment teams. In FIG. 2B, a user interface 260 to a micro-service application is provided which may be in the form of, e.g., a personal computer 270 or via a mobile device 272. These devices may access, via a gateway 274, various services, Service A through Service D 276.1-276.4 within a service layer 262, each of which may be connected to their respective database 286.1-286.4 within a data layer 264.

However, there are many projects still using the traditional monolithic architecture 200 for historical reasons. As a result, use of the monolithic architecture 200 has resulted in difficulties in deployment, expansion, release rollback, rapid development, and testing during the development process. In order to reduce some of these problems, breaking down the traditional monolithic architecture into a microservice architecture has become a requirement for many projects and associated applications. To resolve this kind of requirement, a more commonly used method is to have developers spend a lot of time and cost to, for the monolithic application 200, read the code, sort out the code structure, and split it manually.

Figure 3:
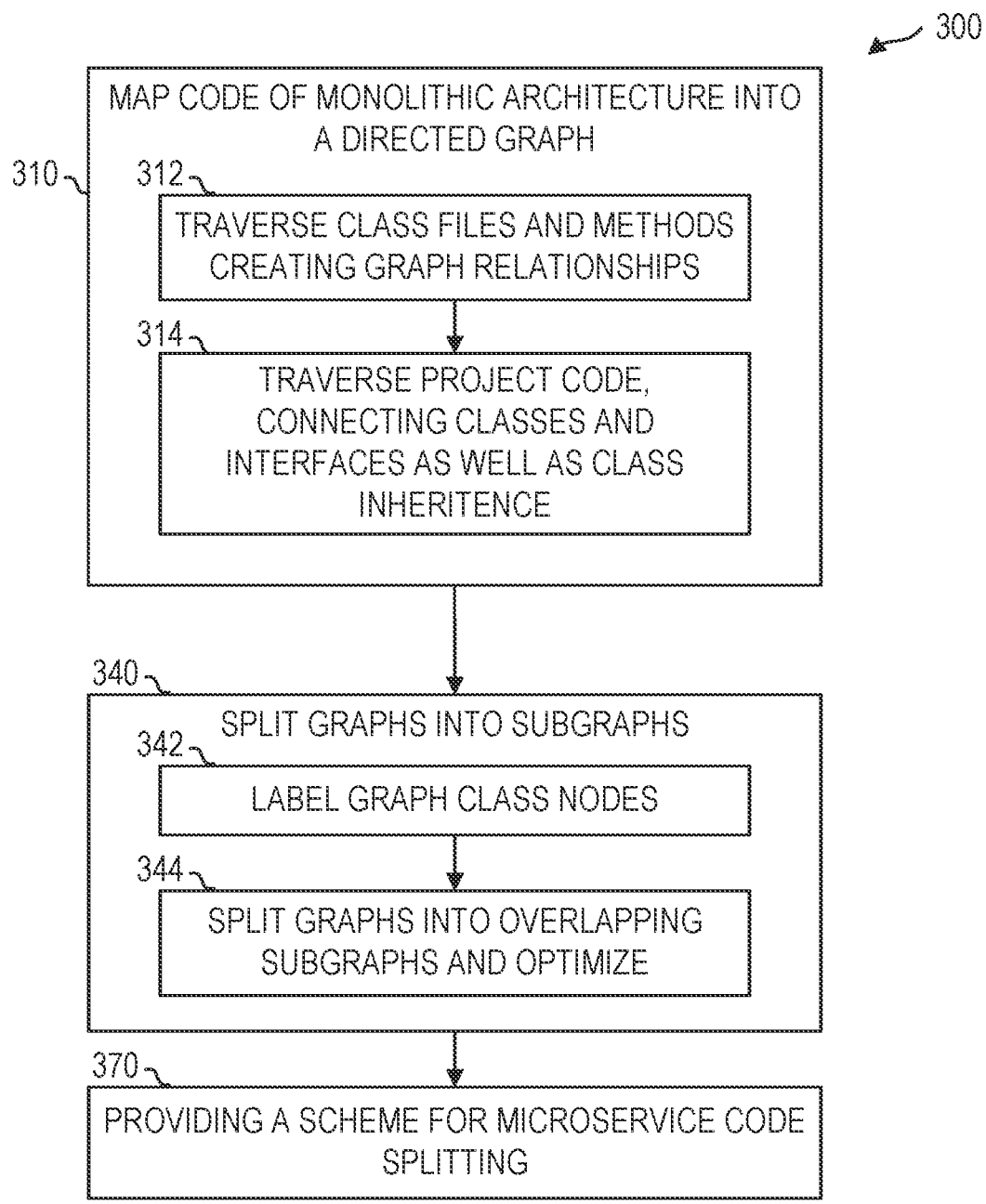
FIG. 3 is a flowchart that illustrates a general process used for various embodiments disclosed herein, according to some embodiments.

FIG. 3 is a flowchart that illustrates a general process 300 used for various embodiments disclosed herein. This process 300 provides an intelligent method to split the traditional monolithic architecture into a microservice architecture. For existing monolithic architecture projects, this method may automatically generate recommendations for splitting and may actually split the monolithic application and its respective code into microservices and their respective code, thus helping developers to sort out the code structure and performing the splitting of the code work.

This process 300 mainly includes three primary operations, illustrated by way of example in FIG. 3, but also with respect to the following block diagrams. In a first primary operation 310, the code from a monolithic architecture is mapped into a directed graph. In a second primary operation 340, a discovery algorithm (e.g., the Community Overlap PRopagation Algorithm (COPRA)) and label classification model may be used to split the graph into subgraphs and optimizing the graph/subgraph. In a third primary operation 370, a recommended solution for microservice splitting is provided corresponding to the subgraph. These three primary operations are discussed in more detail below.

Figure 4A:
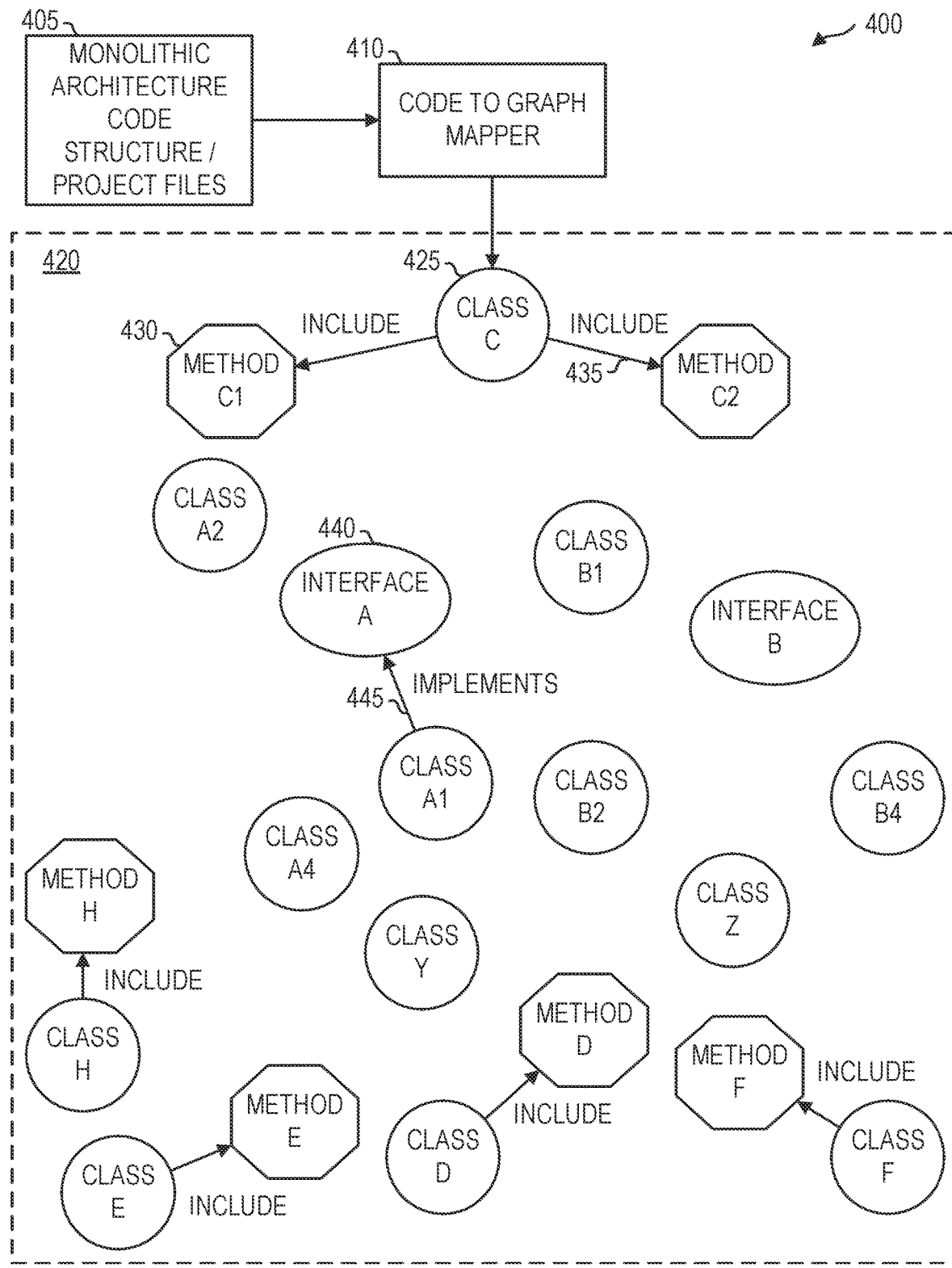
FIGS. 4A and 4B are block diagrams that illustrate the code mapping to a graph, according to some embodiments.
Figure 4B:
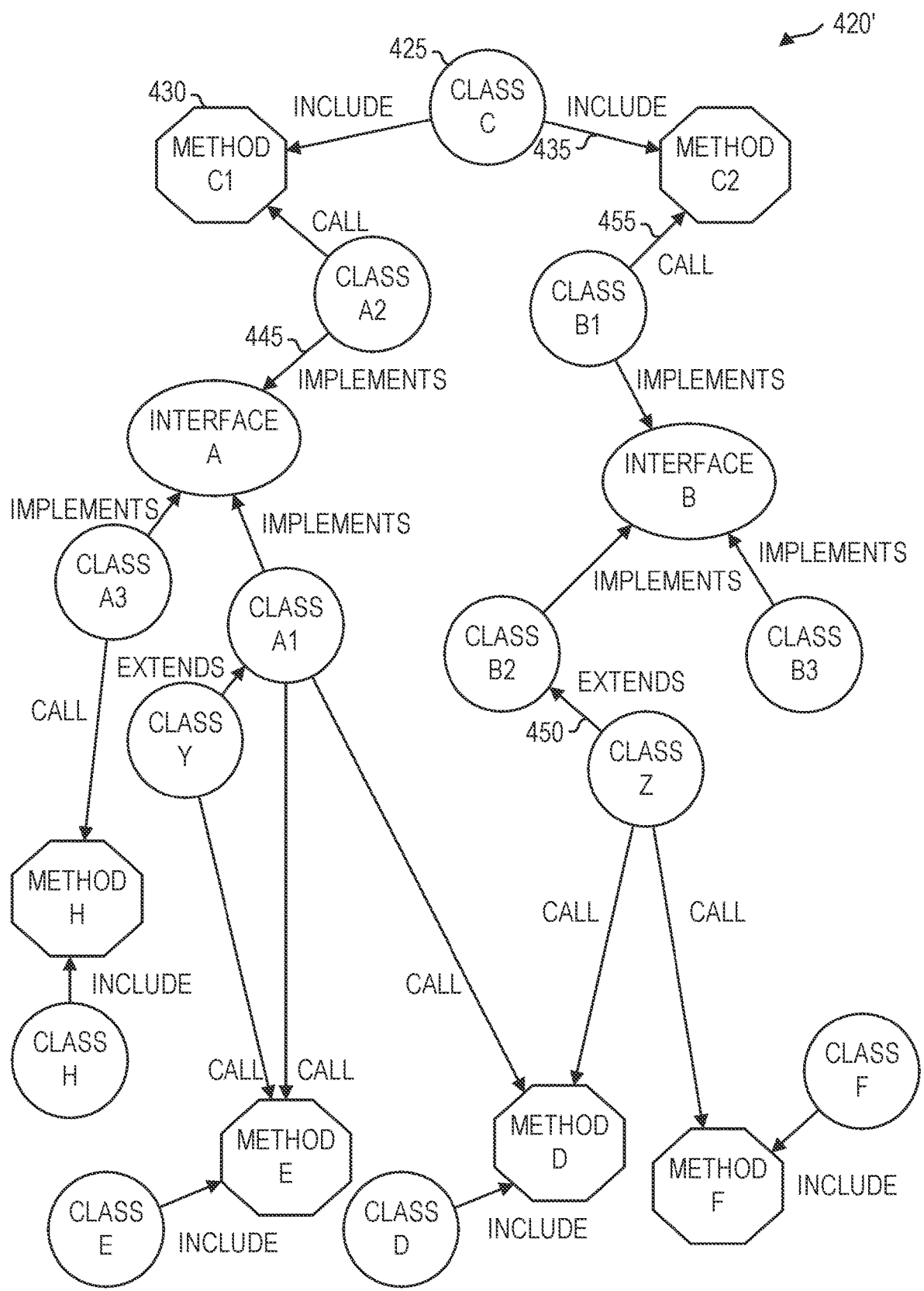

Referring also to FIGS. 4A and 4B, which show related components, the first primary operation 310 uses a code to graph mapper 410 to map the entire project code structure of a project file 405 to a directed graph 420. Taking methods 430 (represented as octagons) and classes 425 (represented as circles) as nodes, the affiliation (represented by the "include" 435 arrow) of each class 425 and method 430, the inheritance between different classes (represented by the "extends" 450 arrow in FIG. 4B), and the invocation of methods 430 by classes 425 are all represented by edges (arrows) on the graph 420. The first primary operation 310 may comprise an operation 312 in which a code to graph mapper 410 traverses the project source files 405, including its class 425 files and all methods 430 in the class of the project. The source files may be, e.g., in a text format, and text parsing algorithms may look for key words designating classes, methods, and other relevant code features. As the mapper 410 performs this traversal, it designates each class 425 and method 430 as a vertex of the graph 420, and uses the "include"relationship 435 between the class 425 and the method 430 to connect with each other. The resultant graph 420 is illustrated by way of example in FIG. 4A.

Next, in operation 314, the graph mapper 410 traverses all of the project files 405 (code) again, and uses the "implements" relationship 445 to connect the implementation between classes 425 and interfaces 440, uses the "extends" relationship 450 to connect the inheritance between different classes 425, and use the "call" relationship 455 to connect the calling relationship of the class 425 to the method 430. Through the above two operations 312, 314, the completed directed graph 420', corresponding to the project files 405 (code), may be obtained.

The second primary operation 340, based on, e.g., a graph-based community discovery algorithm COPRA and a label classification model, may divide the graph 420'generated in the first operation 310 into several subgraphs. It may then combine a hierarchical label of the nodes and a splitting principle of microservices as the constraints of the subgraph, and iteratively optimize an optimal subgraph.

In more detail, in operation 342, the label classification model may be used to label each class node 425 in the graph 420'. The labels may include basic service layer, composite service layer, and controller layer. In operation 344, the community discovery algorithm COPRA may be used to split existing graphs 420' into overlapping subgraphs. In the iterative optimization process of the algorithm, each intermediate result may be verified using the following constraints, and a penalty mechanism may be established. The predefined constraints include: a) different sub-graphs can only be called one-way—it is strictly prohibited to call the subgraphs in a loop (which creates a stop condition); and b) the division of sub-graphs follows the horizontal split according to the level label, not on the vertical—corresponding microservices cannot separate each step but should be split into independent microservices according to the business.

When the algorithm parameters are converged and the constraint conditions are met, the sub-graph split is completed. The splitting of the graph to the subgraph obtained in this way has the characteristics of high cohesion and low coupling, and thus has similar characteristics to the splitting of services to microservices. The splitting principle of microservices may be used as constraints to the splitting principle of subgraphs ensure that the subgraphs obtained can be used as microservice splitting.

Figure 5A:
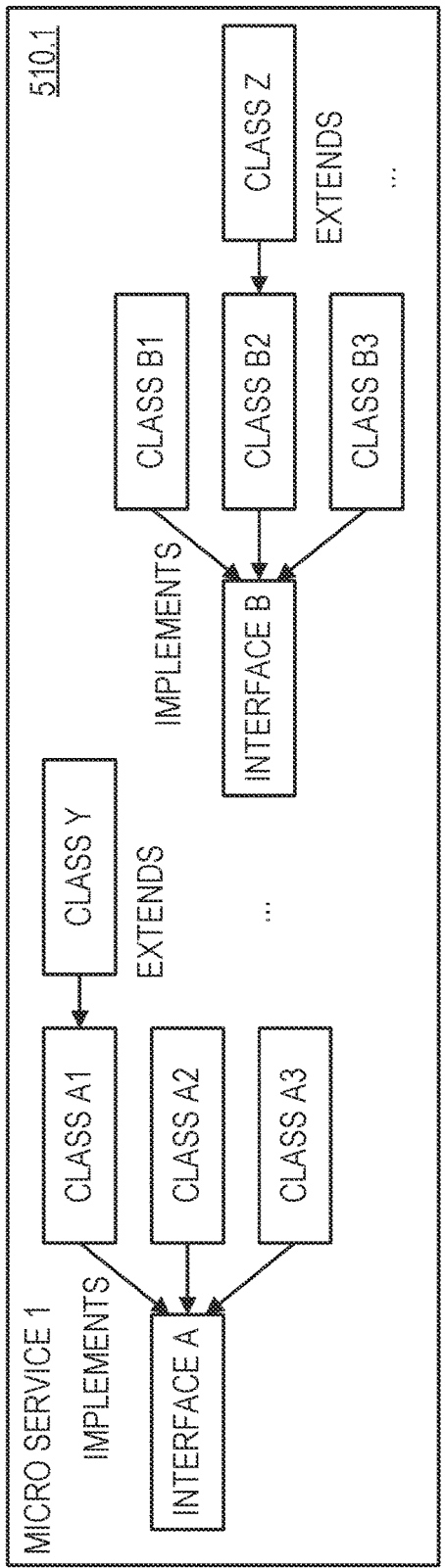
FIGS. 5A and 5B are block diagrams illustrating a scheme for the microservice code splitting, according to some embodiments.
Figure 5A:
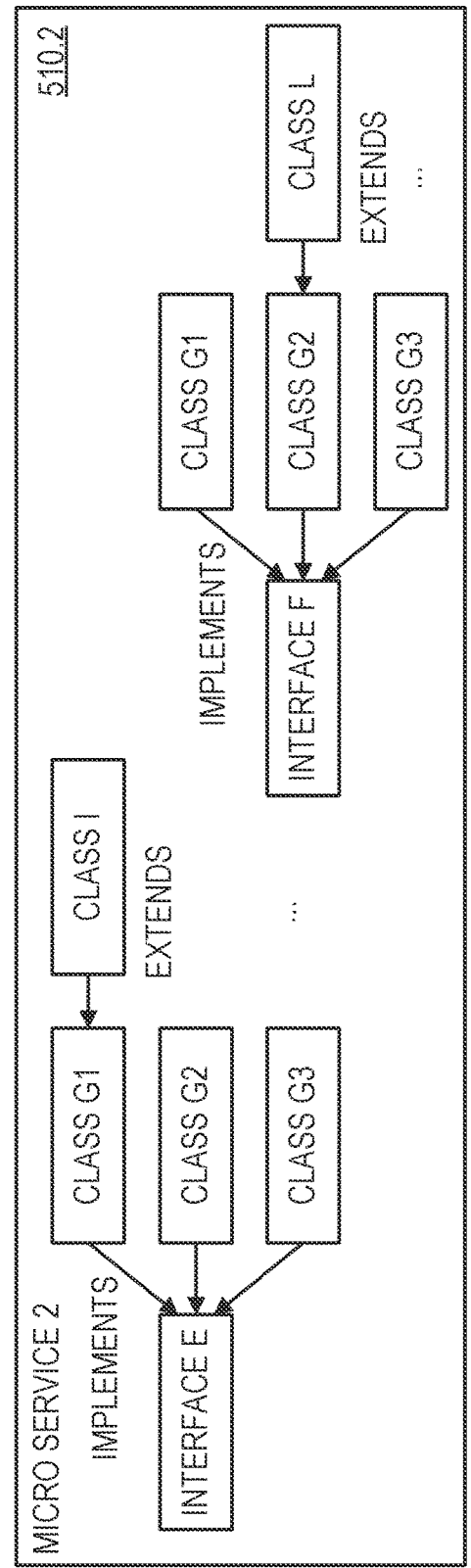
Figure 5B:
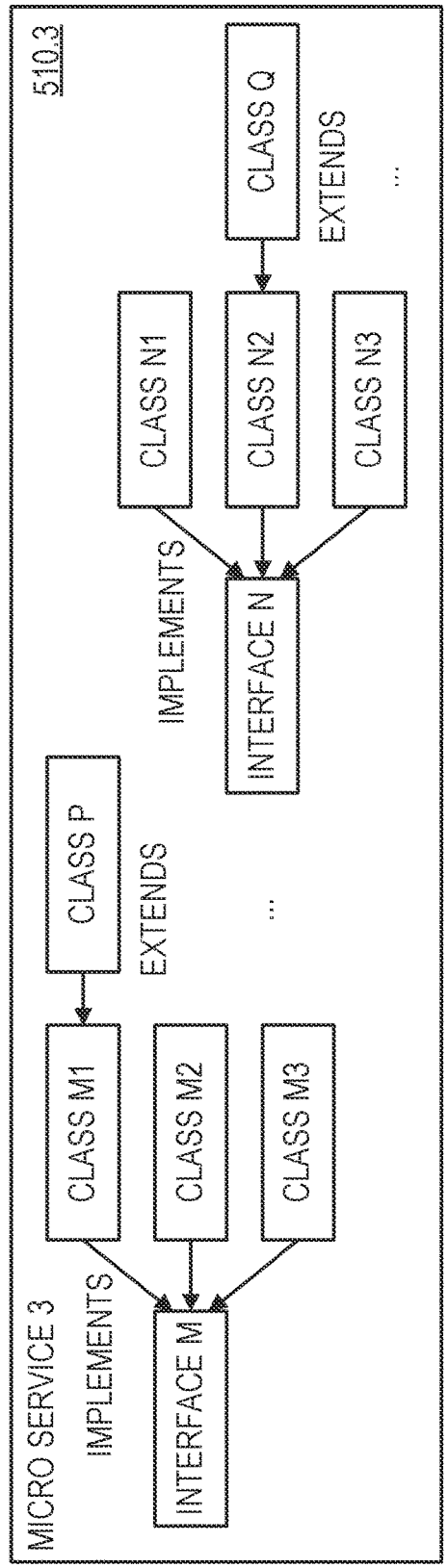
Figure 5B:
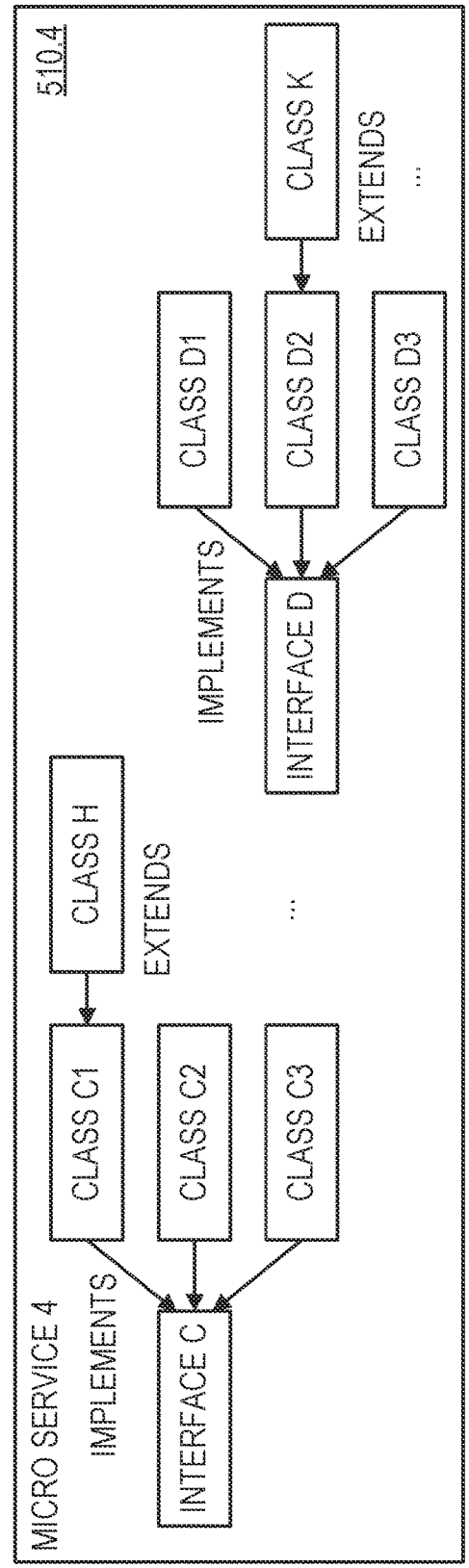

In a third primary operation 370, with each subgraph corresponding to a microservice, and according to the classes and methods contained in the subgraph, a recommended scheme for microservice code splitting is generated. FIGS. 5A and 5B are block diagrams illustrating a scheme for the microservice code splitting. This scheme may be used as a reference for developers to split microservices, or may be used for embedding comments, flags, compiling/interpreting/execution directives into the code listings themselves.

Each subgraph generated in the second primary operation 340 corresponds to a microservice 510.1 through 510.4 (collectively or representatively 510), and the third primary operation 370 generates a recommended solution 500 for microservice splitting according to the code file corresponding to the respective subgraph. As shown in FIGS. 5A and 5B, and according to some embodiments, an output result of this method is the generation a microservice split recommendation solution 500 (or plan). Each microservice 510 has a "Class" as the granularity level, and the parts belonging to different microservices may be, e.g., marked with different colors (not shown), which may serve as the reference plan for microservice splitting to be used by developers. In some embodiments, the microservice split recommendation solution 500 may be utilized in actual copies of the code originally used as an input, and flags and the like embedded into the code copies and/or original code files may be split, rearranged, and reassembled based on the microservice split recommendation.

Technical Application

The one or more embodiments disclosed herein accordingly provide an improvement to computer technology. For example, an improvement to a method for splitting a monolithic application architecture into a microservice architecture using graphs allows for more efficient and effective porting of software into an easier to implement and manage microservice architecture scheme.

What is claimed is:

1. A method for detailing a split of an architecture of a monolithic application into an architecture of a micro service application comprising:
receiving source code for the monolithic application;
mapping the source code into a directed graph;
splitting the graph into subgraphs and optimizing the subgraph;
providing the detailing of the micro service application split, based on the subgraphs; and
performing multiple iterations to optimize a subgraph of the subgraphs; wherein:
the splitting of the graph further comprises utilizing a discovery algorithm and a label classification model for the splitting of the directed graph into the subgraphs;
the iterative optimization comprises verifying each iterative result based on predefined constraints;
the predefined constraints comprise:
different sub graphs can only be called one-way and not in a loop; and
a division of subgraphs follows a horizontal split according to a level label, and not on a vertical; and
the label classification model performs labelling each class node, wherein the label for each class node is selectable from the hierarchical group comprising "basic service layer", "composite service layer", and "controller layer".

2. The method of claim 1, wherein the discovery algorithm is a Community Overlap PRopagation Algorithm (COPRA).

3. The method of claim 1, wherein the mapping comprises traversing a source file, and, based on the traversing:
designating identified classes and methods as respective vertices of the directed graph; and
designating an include relationship between classes and methods to connect them.

4. The method of claim 3, wherein the mapping further comprises:
designating an implements relationship between classes and interfaces; and
designating an extends relationship between classes.

5. The method of claim 4, wherein the extend relationship is an inheritance relationship.

6. The method of claim 1, wherein the providing of the detailing comprises:
generating a recommendation for the micro services application split; and
communicating the recommendation to developers via a network interface.

7. The method of claim 1, wherein the providing of the detailing comprises modifying the source code using the micro service application split to enable a generation of the micro service application from the source code.

8. A system, the system comprising:
a memory, the memory containing one or more instructions; and
a processor, the processor communicatively coupled to the memory, the processor, in response to reading the one or more instructions, configured to:
receive source code for the monolithic application;
map the source code into a directed graph;
split the graph into subgraphs and optimizing the subgraph;
provide the detailing of the micro service application split, based on the subgraphs; and
perform multiple iterations to optimize a subgraph of the subgraphs; wherein:
the split of the graph further comprises the processor being configured to utilize a discovery algorithm and a label classification model for the split of the directed graph into the subgraphs;
the iterative optimization comprises the processor being configured to verify each iterative result based on predefined constraints;
the predefined constraints comprise:
different sub graphs can only be called one-way and not in a loop; and
a division of subgraphs follows a horizontal split according to a level label, and not on a vertical; and
the label classification model causes the processor to label each class node, wherein the label for each class node is selectable from the hierarchical group comprising "basic service layer", "composite service layer", and "controller layer".

9. The system of claim 8, wherein the processor is configured to, for the mapping, traverse a source file, and, based on the traversal:
- designate identified classes and methods as respective vertices of the directed graph; and
- designate an include relationship between classes and methods to connect them;
- designate an implements relationship between classes and interfaces; and
- designate an extends relationship between classes.

10. The system of claim 8, wherein the processor is configured to, for the providing of the detailing:
- generate a recommendation for the micro services application split;
- communicate the recommendation to developers via a network interface; and
- modify the source code using the micro service application split to enable a generation of the micro service application from the source code.

11. A computer program product, the computer program product comprising:
- one or more computer readable storage media; and
- program instructions collectively stored on the one or more computer readable storage media, the program instructions configured to, when run on a processor:
  - receive source code for the monolithic application;
  - map the source code into a directed graph;
  - split the graph into subgraphs and optimizing the subgraph;
  - provide the detailing of the micro service application split, based on the subgraphs; and
  - perform multiple iterations to optimize a subgraph of the subgraphs, wherein:
- the split of the graph further comprises the processor being configured to utilize a discovery algorithm and a label classification model for the split of the directed graph into the subgraphs;
- the iterative optimization comprises the processor being configured to verify each iterative result based on predefined constraints;
- the predefined constraints comprise:
  - different sub graphs can only be called one-way and not in a loop; and
  - a division of subgraphs follows a horizontal split according to a level label, and not on a vertical; and
- the label classification model causes the processor to label each class node, wherein the label for each class node is selectable from the hierarchical group comprising "basic service layer", "composite service layer", and "controller layer".

* * * * *